June 4, 1963  F. H. EDELMAN  3,092,511
MAGNETIC DEVICES AND PREPARATION THEREOF
Filed Nov. 19, 1958  2 Sheets-Sheet 2

INVENTOR.
FRANK H. EDELMAN
BY
Fred Fisher
ATTORNEY.

United States Patent Office 3,092,511
Patented June 4, 1963

3,092,511
MAGNETIC DEVICES AND PREPARATION THEREOF
Frank H. Edelman, Philadelphia, Pa., assignor to Sperry Rand Corporation, New York, N.Y., a corporation of Delaware
Filed Nov. 19, 1958, Ser. No. 775,038
16 Claims. (Cl. 117—107.2)

This invention relates to magnetic devices, and more particularly to square hysteresis loop soft magnetic films with low anisotropy.

This invention further relates to novel methods for making magnetic devices, and more particularly to novel methods for making isotropic square hysteresis loop magnetic films.

In the past, anisotropic magnetic films have been produced by evaporating magnetic materials in an evacuation zone and condensing the vapors onto a substrate. Some of these films have square hysteresis loops. However, these films are anisotropic in character; that is, they have two (each one opposite to each other) "easy" directions of magnetization. Thus, the magnetic films of the prior art, generally, have two stable states.

By the teachings of this invention, magnetic films are produced with low anisotropy, that is, the films produced by this invention have substantially isotropic magnetic characteristics. These films, therefore, have more than two "easy" directions of magnetization and are therefore usable for multi-state operation. More particularly, when isotropic films are used for two state operation, they are capable of being switched from one state to the second state at much higher speeds than other magnetic films of the prior art.

In accordance with this invention, metallic salts of a β-diketone are separated heated, and their vapors are carried by a carrier gas to a heated substrate for deposition thereon. More particularly, in accordance with one embodiment of this invention, iron acetyl acetonate is heated to a temperature of 130° C. and nickel acetyl acetonate is heated to a temperature of 190° C. The vapors thereby produced are carried by a reducing agent, such as hydrogen, to a substrate which has been heated to 390° C. The temperatures may be varied, within certain limits, as set forth more fully hereinafter.

Magentic films can be produced by the use of a magneitc field during the condensation of the vapors upon the substrate and/or during an annealing process. For best isotropy, the condensation of the vapors and/or annealing should occur in a rotating circular magnetic field. Isotropy, however, can be obtained with other types of magnetic fields, or with an absence of a magnetic field.

It is, therefore, an object of this invention to produce a novel magnetic device with fast switching time.

It is a further object of this invention to provide a multi-state magnetic device with substantially zero anisotropy.

Another object of this invention is to provide novel magnetic films with low coercivity.

It is a further object of this invention to provide novel magnetic films which have rectangular hysteresis loops that are substantially isotropic in character.

Another object of this invention is to provide novel methods for carrying forth the above objects.

It is a further object of this invention to produce novel methods for depositing magnetic films.

The novel features of this invention and other objects and advantages thereof, together with its organization and method of operation, will become more apparent in the following description, when read in connection with the accompanying drawings, in which.

Figure 1:
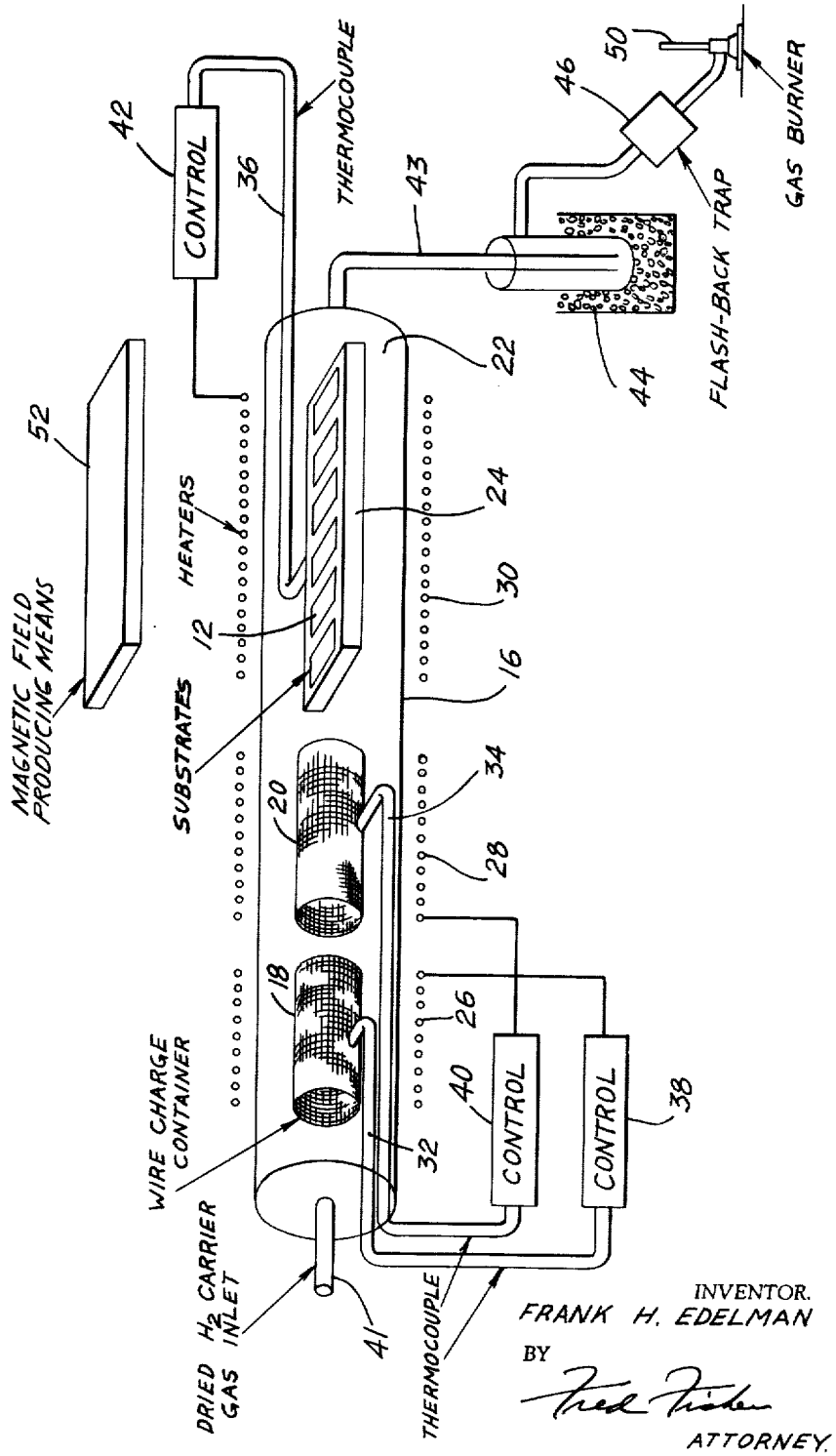
FIG. 1 is an illustration of suitable apparatus for performing one embodiment of this invention.
Figure 2:
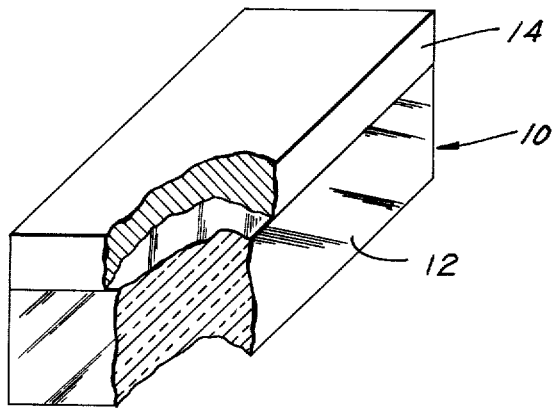
FIG. 2 is a perspective view of a magnetic device produced by carrying forth the novel methods of this invention.

Referring to FIG. 1, there is shown an illustration of apparatus for producing magnetic devices 10 such as illustrated in FIG. 2. A magnetic device 10 comprises a substrate 12, which may be glass, metal or quartz, to which is adhered a metallic film 14. As illustrated, the device 10 is square or rectangular in shape; however, other shapes including circular or elliptical are easily obtainable, and may be preferred for various applications.

FIG. 1 shows a tubular container 16, preferably made of a high softening point glass, such as that sold under the trademark Pyrex. A pair of chambers 18, 20, are located at one end of the container 16 for carrying individual portions of melt. For example, the chamber 18 is a wire sieve adapted for carrying iron acetyl acetonate; the chamber 20 is a wire sieve adapted for carrying nickel acetyl acetonate. A third chamber 22 houses a plurality of substrates 12 which are mounted on the level surface of a brass batt 24. Separate heating coils 26, 28, 30 surround the three chambers 18, 20, 22, respectively. Individual thermocouples 32, 34, and 36 for measuring temperatures are coupled to the respective chambers 18, 20, 22. The thermocouples 32, 34, and 36, are respectively, coupled to control units 38, 40, 42 which control the heaters 26, 28 and 30. At one end of the tubing 16, an inlet 41 is provided for introducing dry hydrogen as a carrier gas. At the other end of the tubing 16, an exhaust 43 is provided wherein the exhausted gases are passed through. These gases are then cooled by a cold trap 44. The dry non-condensible gases then pass through a flash back trap 46 and then are ignited in a gas burner 50. The gas trap 44 is suitably chilled; as for example, by liquid air, or by carbon dioxide in its solid state form. The exhaust gases from the exhaust 43 may be disposed by other desirable means. The substrates 12 are placed in a magnetic field 52 for producing magnetic devices 10 of better uniformity.

The nickel-iron acetyl acetonates are separately heated in the wire sieve containers 18, 20 whose temperatures are adjusted to give the proper composition of the metallic film 14. The iron is heated to approximately 130° C.; the nickel is heated to approximately 190° C.; and the decomposition tube surrounding the substrates is heated to 390° C. Hydrogen is passed through the inlet 41 and thus through the tube 16 at approximately 6 liters per minute for a period of 20 minutes at atmospheric pressure. The process may also be operated with hydrogen at pressures lower than atmospheric. The hydrogen, which acts as a reducing agent, carries the iron and nickel vapors to the substrates. The composition of the films can be varied along the length of the tube 16 so that compositions are obtained ranging from pure nickel to pure iron with thicknesses ranging from a few angstroms to 10,000 angstroms. Films can be produced that are clean, mirror like, and free of pin-holes. The excess gases are cooled, burned, and dissipated. These excess gases are quite varied and may include, for example, mesityl oxide, methyl acetate, acetone, butene-1, carbon dioxide, propylene, propane, methane, carbon monoxide, hydrogen, acetyl acetone, water, and mesitylene. The exact constituents of the gases may vary depending upon its temperature and the time of its measurements. Some of the films produced, depending upon composition, respond to a heat treatment, or annealing in a magnetic field. The coercivity and other magnetic properties depend, in part, upon how the composition is processed. The films may be annealed, subsequent to deposition on a substrate, by heating the films to a temperature of 500° C. to 550° C. and then cooling. The annealing process improves coercivity and the $Br/Bm$ ratio. Films are attainable with coercivity in the unannealed as low as 1.9 oersteds, a squareness ratio as high as 0.99 and a $Br/Bm$ ratio as high as 0.99. Some films have almost exactly the same magnetic properties when measured in orthogonal directions. These films can be used in magnetic memories, magnetic amplifiers, and other applications.

Figure 4:
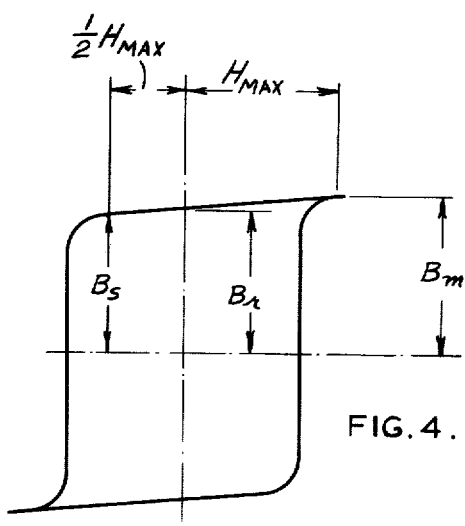
FIG. 4 illustrates a representative hysteresis loop of a magnetic device produced through the novel methods of this invention.

A reference to FIG. 4 clarifies the meaning of the terms "squareness ratio" and "$Br/Bm$ ratio." The squareness ratio is the ratio of the flux density at a drive of minus one-half of the maximum drive to the flux density at maximum drive; as shown, the squareness ratio is $Bs/Bm$. The $Br/Bm$ ratio is the ratio of the flux density at remanence to the flux density at maximum drive.

The thin magnetic alloy films that are produced by this invention have useful magnetic properties for magnetic memories because of their very high squareness ratios, low coercivity and millimicroseconds' switching time. These films have many advantages over the prior art. For example, the apparatus, as described above, is relatively inexpensive when compared to the apparatus required for vacuum deposition of films. The process of this invention can be a continuous one, as desired, in that a series of glass slides or other substrates 12 can be passed continuously through the gas stream. Furthermore, multi-component alloy films are made by the process of this invention at lower temperatures than the high boiling point of the metals as required by the vacuum deposition procedure. The deposition of the metal in a hydrogen environment can be made in either a magnetic or non-magnetic field, as desired, to provide the desired magnetic orientation. Annealing, with or without magnetic field, is done with the same apparatus as the film deposition. Pin-hole free films are prepared by the teachings of this invention, thus eliminating the presence of pin-holes such as produced with vacuum deposited films of comparable thickness. More particularly, the magnetic properties of the films are such that they have square loops in directions mutually perpendicular to each other. The metal deposit, therefore, is quite different from the crystal deposit obtained by vacuum deposition procedure.

Specifically, metallic salts of $\beta$-diketones are selected which, upon deposition, form metals or alloys which have magnetic properties. The iron and nickel salts of acetyl acetonates, when heated, produce vapors, the quantity of which are easily proportioned by temperature control.

When deposition is made in the presence of a rotating circular magnetic field of suitable strength, for example, 36 oersteds, which is applied during deposition and cooling, there results films which display very low anisotropy, showing orthogonal coercivities which deviate less than ¾ oersted and in some cases are within ⅒ oersted of each other. In combination with these properties, the films display a relatively high squareness ratio of at least 0.8 and, frequently, 0.98; coercivities range from 1.4 to 20 with a majority in the range from 2 to 3.

The apparatus illustrated in FIG. 1 may be constructed in different forms, as will be suggested to anyone skilled in the art. For example, one substrate may be used with various geometries to conform to the best practice for preparing memory elements. A substrate can be pre-treated to form conducting and/or insulating layers so that deposition of magnetic films can be made upon them which will result in a completed memory element.

Although the minimum magnetostriction of these films occurs at 78% nickel in comparison with the 82% nickel obtained from structures of the prior art, the preferred composition is 70–75% nickel and 30–25% iron, with approximate minimum and maximum limits of 65% nickel and 85% nickel, respectively.

The preferred thickness range is from 2,000 A. to 3,000 A.; however, 1500 A. is a minimum value below which the results tend to become erratic. The preferred position of the substrate in the magnetic field is in or near the center. The rotating circular magnetic field, when desired, is a 60 cycle field of 30 oersteds at the substrate and is circular within an estimated 5–8%. Such a field can be produced by the use of space quadrature field coils located outside the tube 16 in the region of chamber 22, which coils are excited by phase quadrature currents. The iron acetyl acetonate is volatized at 130° C. and the nickel acetyl acetonate at 190° C. The vapor mix is swept by a current of hydrogen over the substrates which are held to 390° C. After formation of films, substrates are then cooled to 100° C. while still subjected to the rotating magnetic field.

The films produced by this latter process can be switched i.e., the magnetization direction can be changed, at greater speeds than other devices known to the prior art. Furthermore, these films do not require orientation initially in a cross field (i.e. a field perpendicular to the switching field), as those systems of the prior art, to eliminate noise, as they are isotropic. In addition, these films do not require any secondary orientation of the pick-up and drive coils as necessitated in some prior art magnetic device and preparation methods. Furthermore, film memories can be constructed with great economy over prior art methods, because less operations are needed and because the rejection of plates for disorientation is eliminated. It is, therefore, apparent that this invention improves the art of recording information with magnetic films.

The optimum temperatures, as stated above, are iron acetyl acetonate: 130° C., nickel acetyl acetonate: 190° C., and the substrate: 390° C. The optimum temperature range for iron acetyl acetonate is 125° C. to 135° C. If the iron acetyl acetonate is heated to less than 110° C. of more than 135° C., not enough iron acetyl acetonate vapors are carried over for composition or excessive decomposition occurs, respectively. The optimum temperature range for nickel acetyl acetonate is 175° C. to 195° C. If the nickel salt is heated to less than 120° C., no effective film occurs; if less than 175° C., a composition results which is not desired. If the temperature is greater than 195° C. there is too much decomposition. The optimum temperature range for the substrate is 380° C. to 400° C. If the temperature were raised above 500° C., an amorphous deposit results. If the temperature was in excess of 400° C. there is a possibility that the heat would be transferred back to the previous chamber. If heated below 380° C., poor films are produced, not consistent in composition; under 300° C., no film results. Variations, however, in the geometry of the apparatus may suggest minor temperature changes consistent with the teachings of this invention. In particular, it has been found that a one inch diameter tube, 38 inches in length, is suitable for the applications described. However, it is desired that this invention not be limited to specific dimensions herein described.

Magnetic devices of the prior art were, generally, of the bi-stable state variety, wherein a magnetic film could be magnetized in either one of two opposite directions. As described herein, by using magnetic films that are isotropic in directions mutually perpendicular to each other, four stable states are attainable so that the film could be switched from one stable state to a second stable state at a high rate of speed. However, by the inventive processes described herein using hydrogen as a carrier gas, and using a rotating circular magnetic field which rotates at a uniform speed, a completely isotropic magnetic film is obtained, which film offers unlimited possibilities for many uses. A magnetic film which is completely isotropic, such as produced by this invention, has a very large number of stable magnetic states. Therefore, the magnetic film can be switched from one stable state in one direction to a second stable state in a direction having an acute angle with the one direction. Thus, extremely high switching speeds are attainable.

Figure 3:
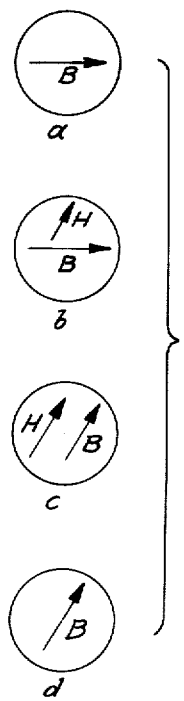
FIG. 3 is a diagrammatic representation of the switching process for an isotropic device produced by this invention.

Although FIG. 1 and FIG. 2 illustrate rectangular shaped magnetic devices and FIG. 3 illustrates circular shaped magnetic elements, any desired shape can be used. Preferably, a circular configuration is the optimum shape.

FIG. 3 illustrates the switching procedure using an isotropic magnetic device. The magnetic film has a remanent flux density B in the direction shown in FIG. 3a and has a magnetic field H applied at an angle thereto, as shown in FIG. 3b. The direction of the magnetic flux density B changes and becomes parallel to the direction of the magnetic field H (see FIG. 3c). Upon the removal of the magnetic field H, the remanent flux density B remains in its position as shown in FIG. 3d. The magnetic flux density changes its direction either by the wall migration process, or the domain rotation process, or a combination of both processes. It is believed that, in most cases, especially with switching angles of less than 135°, the domain rotation process occurs to cause the switching. The magnetic flux density B remains in this latter position due to the fact that there is no "easy" or "hard" direction, but rather that all directions are equally magnetizable in a purely isotropic magnetic device. This action occurs only with magnetic devices which are substantially isotropic, or devices which are equally anisotropic in a plurality of directions. It should be noted that magnetic devices of the prior art are anisotropic and thus have only two stable states. When a magnetic field is applied perpendicular, in the same plane, to the remanent flux density of a prior art anistropic magnetic device, the vector B is directed to its "hard" or unstable direction. The flux density, upon removal of the magnetic field, would then resume an "easy" or stable state, either to its initial condition or at a direction of 180° from its initial direction.

The device of FIG. 3, can, by similar means, be switched back to its initial state by applying an appropriate magnetic field in the forward direction. It will be appreciated, therefore, that the magnetic film of FIG. 3 can be switched from one state to a second state and back to its first state again at much higher speeds than anisotropic devices of the prior art.

Novel methods are described for producing isotropic films. Also, novel metallic films are produced which have characteristics not previously available in the art. These novel films have many advantages including their low anisotropy; these films can be produced with great economy.

Having thus described this invention, it is desired that this invention not be limited to any specific embodiment described, but that this invention be defined by the scope of the claims.

What is claimed is:

1. A method of producing a substantially isotropic magnetic device comprising heating compounds which are salts of β-diketone and a magnetically susceptible metals to temperature sufficiently high to volatilize said metal compounds but below the temperature at which the vapors of the compounds decompose, heating a refractory substrate to a temperature not below 380° C., passing a non-oxidizing carrier gas over the metal compounds whereby vapors of the metal compounds are admixed with the carrier gas and contacting said gaseous mixture with the heated substrate for a sufficient period of time to plate the substrate with a coherent isotropic film substantially free from pin holes and at least 1500 angstroms thick.

2. A method according to claim 1 in which the substrate is heated to a temperature between 380 and 400° C.

3. A method according to claim 1 in which the metallic salts are salts of nickel and iron and they are heated to temperatures to produce a mixture of vapors which on contact with the heated substrate produce a film having from 65 to 85% nickel.

4. A method according to claim 3 in which the proportions of vapors of iron and nickel salts on contacting the heated substrate produce a film having from 70 to 75% nickel .

5. A method according to claim 1 in which the compounds are acetylacetonates.

6. A method according to claim 5 in which the acetylacetonates are acetylacetonates of nickel and iron.

7. A method according to claim 6 in which the temperatures to which the iron and nickel acetylacetonates are heated are adjusted so that the vapors carried by the carrier gas on contacting the heated substrate produce a film having from 65 to 85% nickel.

8. A method according to claim 7 in which the contact of the vapors of iron and nickel acetylacetonates in the carrier gas with heated substrate is sufficiently long to produce a film of at least 1500 angstroms.

9. A method according to claim 7 in which the carrier gas is hydrogen.

10. A method according to claim 7 in which the iron acetylacetonate is heated to a temperature from 125 to 135° C. and the nickel acetylacetonate is heated to a temperature from 175 to 195° C.

11. A method according to claim 7 in which the substrate is glass.

12. A method according to claim 7 in which the substrate is quartz.

13. A method according to claim 7 in which the temperatures are adjusted so that after contacting the substrate a film is produced having 70 to 75% nickel.

14. A method according to claim 13 in which the substrate is heated to a temperature from 380 to 400° C.

15. A substantially isotropic thin film of a nickel iron alloy with a nickel content of 65 to 85% on a substrate which has not been subjected to heating in a vacuum said film being free from pin holes, at least 1500 angstroms thick.

16. A substantially isotropic thin film of a nickel iron alloy with a nickel content of 70 to 75% on a substrate which has not been heated in a vacuum said film being free from pin holes, at least 1500 angstroms thick.

References Cited in the file of this patent

UNITED STATES PATENTS

| | | |
|---|---|---|
| 1,675,120 | Marden et al. | June 26, 1928 |
| 2,430,520 | Marboe | Nov. 11, 1947 |
| 2,671,034 | Steinfeld | Mar. 2, 1954 |
| 2,698,812 | Schladitz | Jan. 4, 1955 |
| 2,704,728 | Pawlyk | Mar. 22, 1955 |
| 2,785,651 | Pawlyk | Mar. 19, 1957 |
| 2,808,345 | Traub | Oct. 1, 1957 |
| 2,842,468 | Brenner | July 8, 1958 |
| 2,853,402 | Blois | Sept. 23, 1958 |
| 2,919,207 | Scholzel | Dec. 29, 1959 |

UNITED STATES PATENT OFFICE
CERTIFICATE OF CORRECTION

Patent No. 3,092,511                                          June 4, 1963

Frank H. Edelman

It is hereby certified that error appears in the above numbered patent requiring correction and that the said Letters Patent should read as corrected below.

Column 1, line 47, for "Magentic" read -- Magnetic --; lines 47 and 48, for magneitc" read -- magnetic --; column 4, line 40, for "of more than" read -- or more than --.

Signed and sealed this 14th day of January 1964.

(SEAL)
Attest:
ERNEST W. SWIDER

EDWIN L. REYNOLDS

Attesting Officer                                      Acting    Commissioner of Patents